United States Patent
Hendriks (10) Patent No.: US 7,079,470 B2
(45) Date of Patent: Jul. 18, 2006

(54) DIFFRACTION DEVICE FOR READING AND/OR WRITING A RECORD CARRIER

(75) Inventor: Bernardus Hendrikus Wilhelmus Hendriks, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 438 days.

(21) Appl. No.: 10/011,990

(22) Filed: Dec. 4, 2001

(65) Prior Publication Data

US 2002/0122375 A1 Sep. 5, 2002

(30) Foreign Application Priority Data

Dec. 11, 2000 (EP) .................................. 00204431

(51) Int. Cl.
*G11B 7/135* (2006.01)

(52) U.S. Cl. .............................. 369/112.08; 369/112.02

(58) Field of Classification Search ........... 369/112.02, 369/112.08, 112.03
See application file for complete search history.

(56) References Cited

U.S. PATENT DOCUMENTS

| | | | |
|---|---|---|---|
| 5,594,818 A * | 1/1997 | Murphy .......................... 385/8 |
| 5,745,465 A * | 4/1998 | Tsai et al. ............... 369/112.17 |
| 5,787,061 A * | 7/1998 | Tsuchiya et al. .......... 369/44.29 |
| 5,815,293 A * | 9/1998 | Komma et al. ................ 359/19 |
| 6,052,353 A | 4/2000 | Fujita ......................... 369/117 |
| 6,301,047 B1 * | 10/2001 | Hoshino et al. ............. 359/566 |
| 6,366,548 B1 * | 4/2002 | Ohyama ................ 369/112.04 |
| 6,385,158 B1 * | 5/2002 | Takagi et al. .......... 369/112.16 |
| 6,449,095 B1 * | 9/2002 | Ohtaki et al. ................ 359/566 |
| 6,567,355 B1 * | 5/2003 | Izumi et al. ............. 369/44.41 |
| 6,577,376 B1 * | 6/2003 | Shih .......................... 349/202 |
| 6,580,674 B1 * | 6/2003 | Nishiyama et al. ..... 369/112.01 |
| 6,618,116 B1 * | 9/2003 | Murata et al. .............. 349/201 |
| 6,707,779 B1 * | 3/2004 | Stallinga ................ 369/112.02 |

FOREIGN PATENT DOCUMENTS

JP 10083560 A * 3/1998

OTHER PUBLICATIONS

Trnslation of JP 10-083560 provided by JPO website.*
Patent Abstracts of Japan, vol. 1998, No. 08, Jun. 30, 1998, JP10083560A.

* cited by examiner

*Primary Examiner*—Brian E. Miller
*Assistant Examiner*—Michael V. Battaglia
(74) *Attorney, Agent, or Firm*—Michael E. Belk (57) ABSTRACT

A device for reading and/or writing a record carrier (13), the device comprising converging means (35, 45, 47, 106, 108) for focusing a radiation beam (27, 101) originating from a radiation source (25) on the record carrier (13). The converging means comprises polarization means (103) and a diffraction grating (107) of birefringent material. Dependent on the direction of polarization, the radiation beam (101) is focused on one of two possible surfaces corresponding to DVD and DVR, respectively. A diffraction grating (107) is present in a central area of the radiation beam (101) and causes diffraction of a first order for one direction of polarization of the radiation beam (101) and diffraction of a second, higher, order for a second direction of polarization of the radiation beam (101). The diffraction grating (107) is made of birefringent material.

20 Claims, 4 Drawing Sheets

DIFFRACTION DEVICE FOR READING AND/OR WRITING A RECORD CARRIER

The invention relates to a device for reading and/or writing a record carrier, the device comprising a radiation source and means for converging a radiation beam from the radiation source on a written surface and/or a surface to be written of the record carrier, said means comprising polarization means and a diffraction grating of at least a birefringent material for focusing the radiation beam on one of two possible types of surfaces in dependence upon a direction of polarization of the radiation beam, a first surface of said two possible types of surfaces corresponding to a surface to be read and/or to be written of a first type of record carrier, and a second surface corresponding to a surface to be read and/or to be written of a second type of record carrier.

Such a device is known from U.S. Pat. No. 6,052,353. The record carriers described in this document are a CD and a DVD. Light coming from a single light source functioning as a radiation source is converged on a written surface of the record carrier. The converging means also comprise polarization means and a diffraction grating of at least a birefringent material. Dependent on a direction of polarization of the light from the light source functioning as a radiation source, the radiation beam converges either on a first surface of two possible surfaces, which is a written surface of a CD, or on a second surface of two possible surfaces, which is a written surface of a DVD. In accordance with the conventional standard, a transparent layer has a thickness of 1.2 mm on a CD and 0.6 mm on a DVD between an entrance surface of the record carrier, through which the radiation enters the record carrier, and the written surface and/or surface to be written. The transparent layer is transparent to the radiation of the radiation source throughout this thickness. Moreover, a numerical aperture of a device is required for reading a DVD (0.6) which is larger than the numerical aperture of a device suitable for reading a CD (0.45) or for writing a CD (0.50).

A DVD (Digital Video Disc) has a storage capacity of 4.7 Gb of information and can be read by a radiation source emitting red light. For recording larger quantities of video on a disc having the same circumferential dimensions as a CD or DVD, a standard named DVR (Digital Video Recording) has been proposed. A considerably larger quantity of information than on a DVD can be written on a DVR. In DVR, use is made of a radiation source emitting blue light. Use should also be made of a larger numerical aperture: 0.85, whereas the numerical aperture for DVD is only 0.6.

It is an object of the invention to provide a device with which a single radiation source is used, both for writing and reading on a DVR format and reading on a DVD format. Since the required radiation source for the DVR format is a blue radiation source, it should also be possible to read the associated DVD with a blue radiation source. Besides the color of the light used, and the difference in numerical apertures, the transparent layer for DVR must also be thinner than the known transparent layer for DVD. It is expected that the thickness of the transparent layer for DVR will be 0.1 mm.

According to the invention, this object is achieved in a device as described in the opening paragraph in that the diffraction grating is present in a central area of the radiation beam, and in that the diffraction grating focus substantially a first-order diffraction for a first direction of polarization of the radiation beam and substantially a second, higher-order diffraction beam for a second direction of polarization of the radiation beam.

It is thereby achieved that, for DVD applications, the radiation beam undergoes a higher-order diffraction when the direction of polarization of the radiation beam is suitably chosen, so that the focus will be at a first distance from the entrance surface. For the other direction of polarization, the radiation beam will undergo a zero-order diffraction, hence no additional diffraction at all, as if there were no diffraction gratings at all. Focusing will therefore take place at a second distance from the entrance surface of the record carrier.

Due to this choice of placing the diffraction grating in a central area of the radiation beam, the presence of the diffraction grating is not at all relevant for a zero-order diffraction, when DVR is used, while the diffraction grating is not larger than is strictly necessary for reading DVD. However, in diffraction gratings in accordance with the prior art, at least one central aperture must always be free from the diffraction grating so that a large grating must be provided. In the case where the diffraction grating does not extend in the central part of the radiation beam any further than is necessary for obtaining a numerical aperture of 0.6 for DVD, the incident radiation beam may have the same cross-section without any significant problem as the radiation source which must be used for DVR. The reason is that the radiation beam used for DVD has a different direction of polarization than the radiation beam used for DVR, despite the same diameter. Even if a broad radiation beam is used for DVD, only the narrower central part of this radiation beam will be diffracted in the higher order by the diffraction grating and give rise to focusing at the correct depth (the DVD depth) from the entrance surface of the record carrier. Possible parts of the radiation beam outside the central part, incident on the diffraction grating, are focused at the same depth beneath the entrance surface of the record carrier as the parts of an equally large radiation beam having a modified polarization which is not influenced by the diffraction grating because a zero-order diffraction takes place for this modified direction of polarization. The parts of the radiation beam outside the central part are focused at several tenths of a millimeter from the focus of the parts of the radiation beam within the central part and have a substantially negligible intensity at the location of the focused central part of the radiation beam.

The diffraction grating is preferably arranged on a plane surface.

The converging means preferably comprise at least one lens having a plane surface, and the diffraction grating is arranged on the plane surface of the at least one lens.

It is thereby achieved that the diffraction grating can be designed and manufactured in a relatively simple way and that the positioning of the diffraction grating with respect to the radiation beam, which is translated in a positioning with respect to the edge of the at least one lens, is simpler than alignment at two separate locations.

The diffraction grating is preferably made of only a birefringent material.

It is thereby achieved that a separate manufacturing step is no longer necessary after the surface structure of the diffraction grating has been provided. It is to be noted that, in U.S. Pat. No. 6,052,353, the birefringent material does not only have to be designed but also ion exchange should take place in given areas of the diffraction grating before the diffraction grating as such is finished.

The birefringent material is preferably a liquid crystal material which is curable by ultraviolet light.

If the polarization means polarize the radiation beam circularly, the liquid crystal material is preferably a cholesteric liquid crystal material.

The diffraction grating preferably comprises annular zones.

Each zone preferably comprises a profile having at least two steps. It is thereby achieved that in a radiation beam of one direction of polarization, at which the birefringent material has a first refractive index, the heights of the steps always correspond to a phase trajectory of an integral number of times $2\pi$, whereas the same heights for a radiation beam of the other direction of polarization, and hence a different refractive index, have a phase trajectory which is different from an integral number of times $2\pi$. Consequently, for the beam for which the phase trajectory is an integral number of times $2\pi$, a zero-order diffraction takes place, and for the beam at which the phase trajectories are not an integral number of times $2\pi$, the diffraction grating causes a higher-order diffraction.

The zones preferably comprise a blazed profile.

These and other aspects of the invention are apparent from and will be elucidated with reference to the embodiments described hereinafter.

Figure 1:
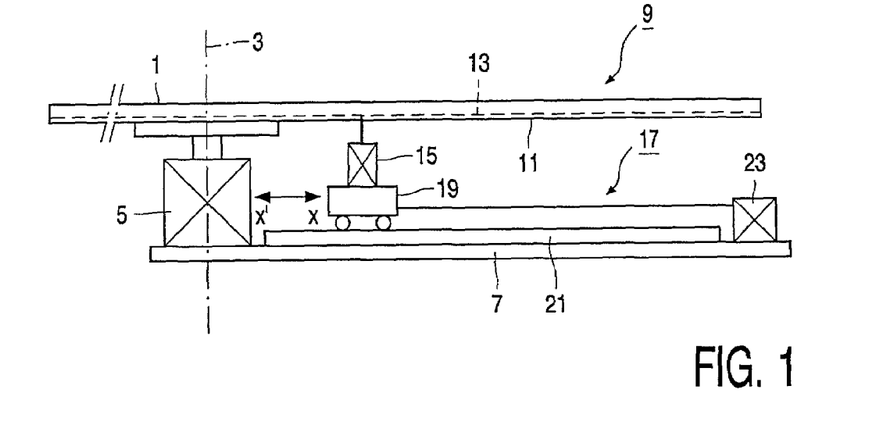
FIG. 1 shows diagrammatically a reading and/or writing device.

The embodiment of an optical player shown diagrammatically in FIG. 1 comprises a table 1 which is rotatable around an axis of rotation 3 and can be driven by an electric motor 5 secured to a frame 7. An optically readable record carrier 9 such as, for example, a DVD or a DVR can be placed on the table 1, which record carrier comprises a disc-shaped transparent substrate which is provided with an information layer 13 having a spiral information track. The information layer 13 is covered by a transparent layer 11. The optical player further comprises an optical scanner 15 for optically scanning the information track of the record carrier 9. The scanner 15 is displaceable substantially in two opposite directions X and X' with respect to the axis of rotation 3 by means of a displacement device 17 of the optical player. To this end, the scanner 15 is secured to the slide 19 of the displacement device 17 which is further provided with a straight guiding means 21 extending parallel to the X direction and arranged on the frame 7, across which guiding means the slide 19 is displaceable, and an electric motor 3 with which the slide 19 is displaced on the guiding means 21. During operation, the motors 5 and 23 are driven by an electric control unit (not shown) of the optical player, whereby the record carrier 9 is rotated about the axis of rotation 3 and simultaneously the scanner 15 is displaced parallel to the X direction in such a way that the spiral information track present on the record carrier 9 is scanned by the scanner 15. During scanning, information which is present on the information track can be read by the scanner 15, or information can be written on the information track by the scanner 15.

Figure 2:
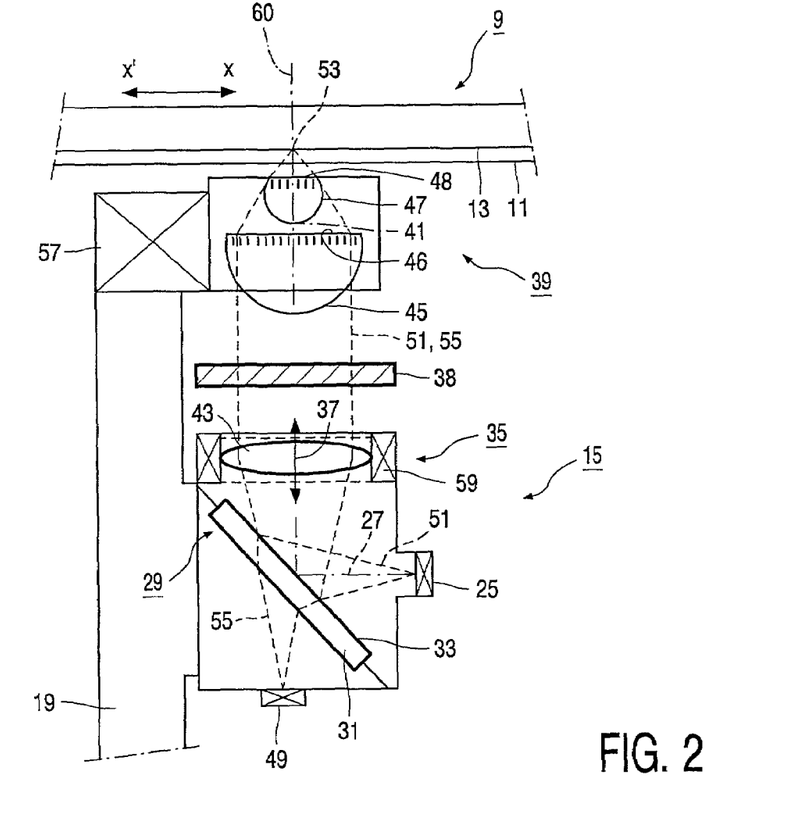
FIG. 2 shows diagrammatically an optical scanner.

The scanner 15 comprises a radiation source 25 such as, for example, a semiconductor laser having an optical axis 27. Moreover, the scanner 15 comprises a radiation beam splitter 29 comprising a transparent plate 31 arranged at an angle of 45° to the optical axis 27 of the radiation source 25 and having a reflective surface 33 facing the radiation source 25. The scanner 15 also comprises a collimator lens unit 35 with an optical axis 37 and an optical lens system 39 with an optical axis 41, the collimator lens unit 35 being arranged between the radiation beam splitter 29 and the lens system 39. In the embodiment shown, the collimator lens unit 35 comprises a single collimator lens 43, while the lens system 39 comprises a first lens, or objective lens, 45 and a second lens, or auxiliary lens, 47 arranged between the objective lens 45 and the record carrier 9. In the embodiment shown, the optical axis 37 of the collimator lens unit 35 and the optical axis 41 of the lens system 39 coincide and enclose an angle of 90° with respect to the optical axis 27 of the radiation source 25. The scanner 15 further comprises an optical detector 49 of a known and conventional type, arranged, with respect to the collimator lens unit 35, behind the radiation beam splitter 29.

During operation, the radiation source 25 generates a radiation beam 51 which is reflected by the reflective surface 33 of the radiation beam splitter 29 and focused by the lens system 39 to a scanning spot 53 on the information layer 13 of the record carrier 9. The radiation beam 51 is reflected by the information layer 13 to a reflected radiation beam 55 which is focused on the optical detector 49 via the lens system 39, the collimator lens unit 35 and the radiation beam splitter 29. For reading the information which is present on the record carrier 9, the radiation source 25 generates a continuous or pulsed radiation beam 51, while the optical detector 49 supplies a detection signal which corresponds to a sequence of consecutive elementary information marks, present in the scanning spot 53, on the information track of the record carrier 9. For writing information on the record carrier 9, the radiation source 25 generates a radiation beam 51 having a power which corresponds to the information to be written, while a sequence of consecutive elementary information marks on the information track of the record carrier 9 is generated in the scanning spot 53. It is to be noted that the radiation source 25, the collimator lens unit 35 and the lens system 39 may be arranged differently with respect to each other. For example, the invention comprises embodiments in which the optical axis 37 of the collimator lens unit 35 and the optical axis 41 of the lens system 39 mutually enclose an angle of 90°, and in which a mirror is arranged between the collimator lens unit 35 and the lens system 39. In these embodiments, the optical scanner has reduced dimensions, viewed parallel to the optical axis 41 of the lens system 39. Embodiments are also feasible in which the radiation source 25 and the collimator lens unit 35 are not arranged on the slide 19 but in a fixed position with respect to the frame 7 and in which the optical axis 37 of the collimator lens unit 35 is directed parallel to the radial directions X, X'. In these embodiments, only the lens system 39 and an additional mirror are arranged on the slide 19, so that the displaceable mass of the slide 19 is reduced.

As is further shown in FIG. 2, the optical scanner 15 comprises a first actuator 57 and a second actuator 59. By means of the first actuator 57, the lens system 39 is displaceable through relatively small distances parallel to the optical axis 41 and through relatively small distances parallel to the X direction. By displacing the lens system 39 parallel to the optical axis 41 by means of the first actuator 57, the scanning spot 53 is focused with the desired accuracy on the information layer 13 of the record carrier 9. By displacing the lens system 39 parallel to the X direction by means of the first actuator 57, the scanning spot 53 is held with the desired accuracy on the information track to be scanned. To this end, the first actuator 57 is controlled by said control unit of the optical player which receives a focus error signal and a tracking error signal from the optical detector 49. By means of the second actuator 59, the collimator lens 43 of the collimator lens unit 35 is displaceable through relatively small distances parallel to the optical axis 37. By displacing the collimator lens 43 parallel to the optical axis 37 by means of the second actuator 59, spherical aberration of the radiation beam 51, caused by the transparent layer 11 of the record carrier 9, can be corrected. Such spherical aberration is mainly caused by fluctuations in the thickness of the layer 11. To this end, the second actuator 59 is controlled by means of an electric control current by said control unit of the optical player which receives an error signal from a sensor (not shown), while, for example, the thickness of the transparent layer 11 near the scanning spot 53 is measurable. The control unit is adapted to control the electric current through the second actuator 59 in such a way that the collimator lens 43 can be positioned in a position in which said spherical aberration is corrected in a predetermined, known and conventional manner.

A liquid crystal cell 38, with which it is possible to change the polarization of the radiation beam from p-polarization to s-polarization, is arranged between the collimator lens 43 and lens system 39.

Figure 3:
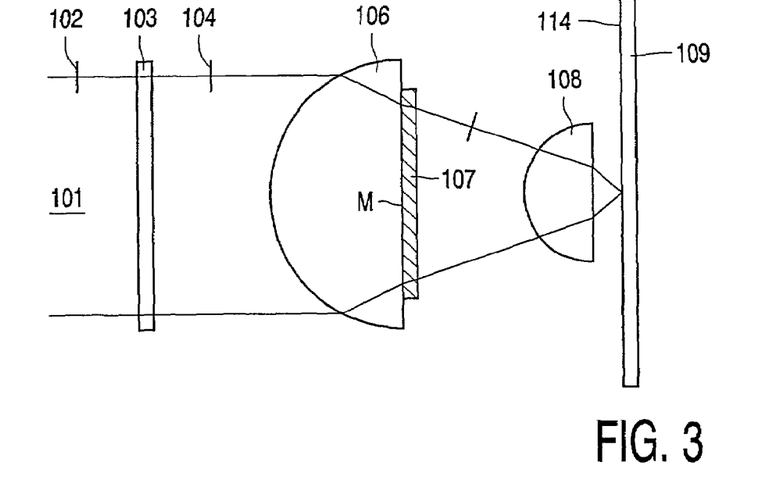
FIG. 3 shows diagrammatically a device according to the invention for a first direction of polarization of the radiation beam.
Figure 4:
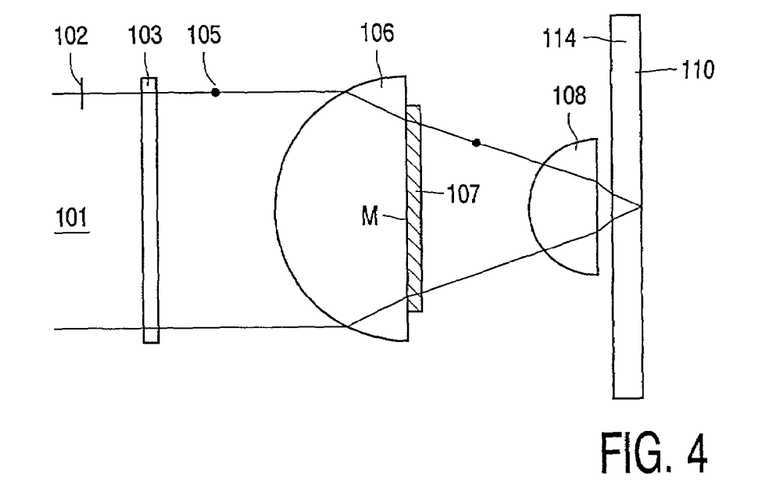
FIG. 4 shows diagrammatically the device according to the invention for a second direction of polarization of the radiation beam.
Figure 5:
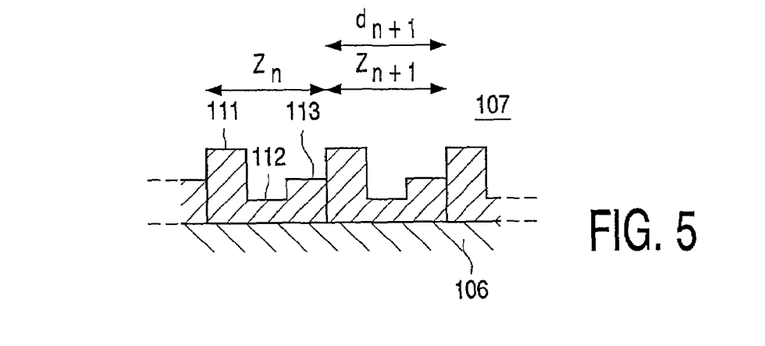
FIG. 5 is a diagrammatic cross-section of a plurality of zones of the diffraction grating.

A specific embodiment of the optical lens system changes the parallel radiation beam 51 having a wavelength of 400 nm and polarized, for example, in the s direction, to a converging beam having a numerical aperture (NA) of 0.85, which forms the scanning spot 53 on the information layer 13 through the transparent layer 11 of the record carrier 9. The first lens 45 of the optical system 39 has a thickness of 1.500 mm at the optical axis 60 and an entrance pupil diameter of 2.835 mm. The first lens 45 is made of Schott glass FK3 having a refractive index of 1.477 and an Abbe number of 66. The convex surface of the first lens 45, facing the collimator lens 43, has a rotationally symmetrical aspherical shape defined by the equation $$z(r)=cr^2(1+(1-(1+b)c^2r^2)^{1/2})^{-1}+\Sigma^8_{i=2}A_{2i}r^{2i}$$

in which z is the position of the surface in the direction of the optical axis 60 in millimeters, r is the position in millimeters to the optical axis 60, c is the curvature (the reciprocal of the radius), b is the conic constant and $A_k$ is the coefficient of the $k^{th}$ power of r. In this case $c=0.533$ mm$^{-1}$ and $b=0$. The values of the coefficients $A_4$ to $A_{16}$ are $-0.0096653516$, $-0.0031223071$, $-0.0004646800$, $-2.9911127 \; 10^{-5}$, $-0.0001740062$, $6.6600388 \; 10^{-5}$ and $-1.3526451 \; 10^{-5}$, respectively. The interface 46 of the first lens 45 opposite the convex surface has an infinite radius of curvature. A planar diffractive structure consisting of annular zones, which will be further described with reference to FIG. 5, is present on the interface. In FIG. 3, the reference numeral 101 denotes a radiation beam, for example a light beam, which originates from the radiation source 25 and is polarized in a direction parallel to the plane of the drawing, which is indicated by the reference numeral 102. The reference numeral 103 denotes a device modifying the direction of polarization, which device can maintain the direction of polarization of the radiation beam 101, as is denoted by reference numeral 104 in FIG. 3, or can rotate through 90°, as is denoted by reference numeral 105 in FIG. 4. The device 103 changing the direction of polarization is known per se and comprises, for example, a twisted nematic liquid crystal. The radiation beam 101 is subsequently incident on a first plano-convex lens 106 which is denoted by reference numeral 45 in FIG. 2 and described with reference to this Figure, whose plane side has a planar diffractive structure, hereinafter referred to as diffraction grating, 107 according to the invention. After passing through the plano-convex lens 106 and the diffraction grating 107, the beam 101 is incident on a second plano-convex lens 108 denoted by reference numeral 47 in FIG. 2 and described with reference to this Figure. Subsequently, the beam is incident on a transparent layer 109 (FIG. 1) and 110 (FIG. 2) of a record carrier. As will be apparent from the following description of FIGS. 6 and 7, it should be noted that both the diameter of the diffraction grating 107 and the thickness of the transparent layers 109 and 110 can be adapted to each other in a correct way.

FIG. 5 shows an example of a part of the diffraction grating as can be used in a device according to the invention. The diffraction grating 107 has several zones $Z_n$, $Z_n+1$, ... etc. The zones $Z_n$ extend circularly around the center M of the plane side of the plano-convex lens 6 (see FIGS. 3 and 4). The dimensions of a zone in the radial direction are dependent on the distance between the zone $Z_n$ and the point M.

Figure 8:
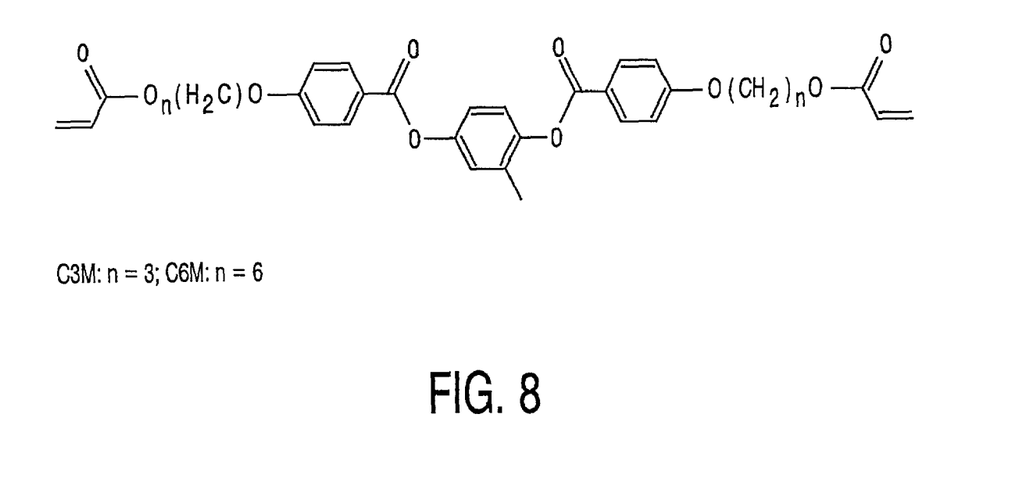

The zone boundaries $r_j$ of the diffraction grating 107 are defined by the equation $$1531{,}752r^2_j - 233{,}322r^4_j + 299{,}534r^6_j - 288{,}624r^8_j = 2\pi j$$

in which j is always an integer. The structure extends up to a radius of 0.695 mm. Then there are 112 zones, with the narrowest zone (near the edge of the diffraction grating) being 3.26 μm wide. The current lithographic techniques provide the possibility of making such structures having three or even more sub-zones within the narrowest zone. The diffractive structure is made of a reactive liquid crystal material. An example of such a material with $n_o = 1.51$ and $n_e = 1.70$ is C6M/E7 50/50 (in % by weight) (see FIG. 8). A photoinitiator (for example, Darocure 4265) has been added for photopolymerization. An alternative mixture is C6M/C3M/E7 40/10/50 (in % by weight) (see FIG. 8). After photopolymerization at room temperature, the refractive indices $n_o$ and $n_e$ will be 1.55 and 1.69, respectively. The codes used refer to the following substances:

E7: 51% $C_5H_{11}$cyanobiphenyl, 25% $C_5H_{15}$cyanobiphenyl, 16% $C_8H_{17}$cyanobiphenyl, 8%$C_5H_{11}$cyanotriphenyl.

C3M: 4-(6-acryloyloxypropyloxy)benzoyloxy-2-methylphenyl 4-(6-acryloyloxypropyloxy)benzoate C6M: 4-(6-acryloyloxyhexyloxy)benzoyloxy-2-methylphenyl 4-(6-acryloyloxyhexyloxy) benzoate The temperature at which photopolymerization takes place may be used for adapting the refractive indices $n_o$ and $n_e$ (and hence the birefringence). For example, when the temperature is changed from 30° C. to 140° C., $n_e$ can be adapted by 0.01 and $n_o$ can be adapted by about 0.03. These values may also be fine-tuned by changing the mixing ratio.

A preferred embodiment of a diffraction grating is shown in a cross-section in FIG. 5 and comprises three areas 111, 112 and 113 per zone. The material of the diffraction grating 107 is a birefringent material whose details have been described hereinbefore. FIG. 5 shows an embodiment in which each zone has a structure having a first height at step 111, a second height at step 112 and a third height at step 113, denoted by h111, h112 and h113, respectively.

The birefringent layer is oriented in such a way that the s-polarization selects the $n_o$ refractive index. The structure within a zone and repeated in every zone is a stepped structure, with each step having a height h which is an integral multiple of $h_o$, defined by $$h_o = \frac{\lambda}{n_o - 1}$$

in which λ is the wavelength (λ=400 nm) and $n_o$ is the ordinary refractive index ($n_o$=1.55). In this way, the structure has phase steps of an integral number of times 2π, so that this structure has no influence for the s-polarization. When every zone is built up of three steps with an equal width and a height ratio of $1h_o$, $2h_o$ and $3h_o$, respectively, the light will not be scattered for the s-polarization (zero-order diffraction is thus selected). For the p-polarization, which is perpendicular to the s-polarization, the refractive index of the birefringent layer is now $n_e$=1.69. The stepped structure now has relative phase jumps which are unequal to an integral number of times 2π, namely 0.5092π, 1.0184π and 1.5276π. In this case, the first-order diffraction is selected with an efficiency of 58%. In the given structure, it is known that the maximum percentage which may theoretically reach the first-order diffraction is 68.4%.

The second lens 47 (see FIG. 2) of the optical lens system 39 (108 in FIGS. 3, 4, 6 and 7) has a thickness of 0.975 mm at the optical axis 60 and a distance of 1.337 mm to the first lens 45. The second lens 47 is made of Schott glass SFL56. The aspherical shape of the convex surface of the second lens 47, facing the first lens 45, is defined by the equation (1) in which c=1.031 mm$^{-1}$ and b=0 and the values of the coefficients $A_4$ to $A_{16}$ are −0.05483298, 0.009373890, 0.067727252, −0.93408194, 3.6700376, −9.1381272 and 6.5187469, respectively. The interface 75 on the other side of the second lens 47 has an infinite radius of curvature. The free working distance in the case of an s-polarized beam, between the optical lens system 39 and the transparent layer 11, is 0.075 mm, while the transparent layer 11 has a thickness of 0.1 mm and a refractive index n of 1.624 at said wavelength of the radiation beam 51. In the case of the p-polarized beam, the specific embodiment of the optical lens system 39 changes the parallel radiation beam 51 having a wavelength of 400 nm to a converging beam having a numerical aperture (NA) of 0.6, which forms the scanning spot 53 on the information layer 13 through the transparent layer 11 of the record carrier 9. Since the radiation beam now undergoes a first-order diffraction in the diffraction grating, the radiation path through lens 47 is changed in such a way that a diffraction-limited spot is produced on the information layer 13 for a record carrier having a thickness of 0.6 mm of the transparent layer 11 and a refractive index n of 1.624. The free working distance between the optical lens system 39 and the transparent layer 11 is now 0.050 mm. The free working distance can be influenced by giving the diffractive structure a stronger of weaker focusing effect.

The provision of steps in the annular zones $Z_n$ may be refined so that a blazed profile can be approached. The better this blazed profile is approached, the more radiation will come in one order. Dependent on the production technology used for manufacturing the diffraction grating 107, which technology is known to those skilled in the art, the diffraction grating 107 may also have a blazed profile. In that case, the planar diffractive structure extends throughout the aperture and an order different from zero is preferably chosen both for DVD and for DVR.

It has been assumed in the foregoing that the radiation beam 101 is linearly polarized, both for the direction of polarization 102 and the direction of polarization 104 and the direction of polarization 105. However, the invention is not limited to linearly polarized radiation beams but also works for a circularly polarized radiation beam 101 in which the device 103 changing the direction of polarization then changes a direction of polarization from levorotatory to dextrorotatory, or conversely. When circularly polarized light is used in the radiation beam 101, it is preferred to manufacture the diffraction grating 107 of a cholesteric liquid crystal material, which has a different refractive index for levorotatory and dextrorotatory circularly polarized radiation.

Figure 6:
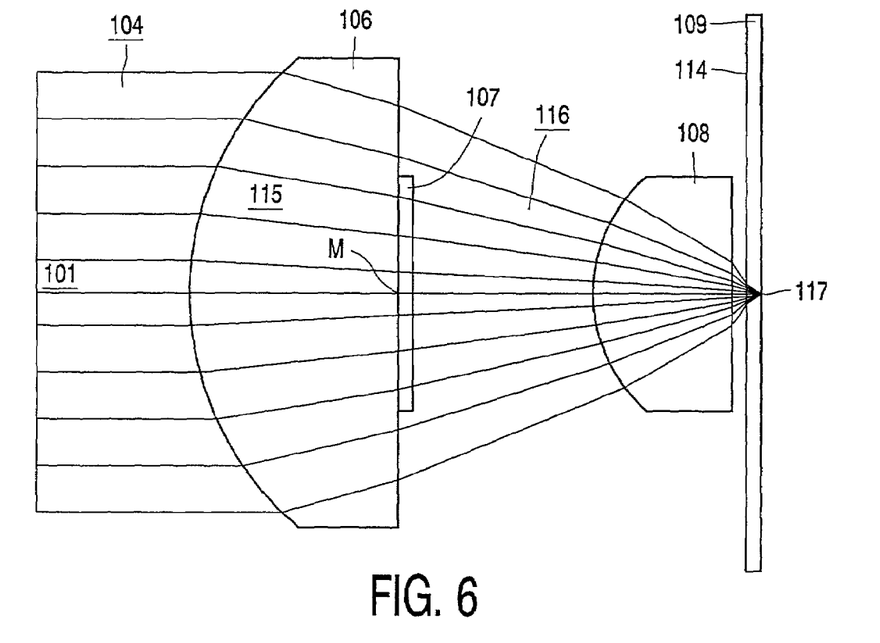
FIG. 6 is a cross-section of a device according to the invention, used for DVR.
Figure 7:
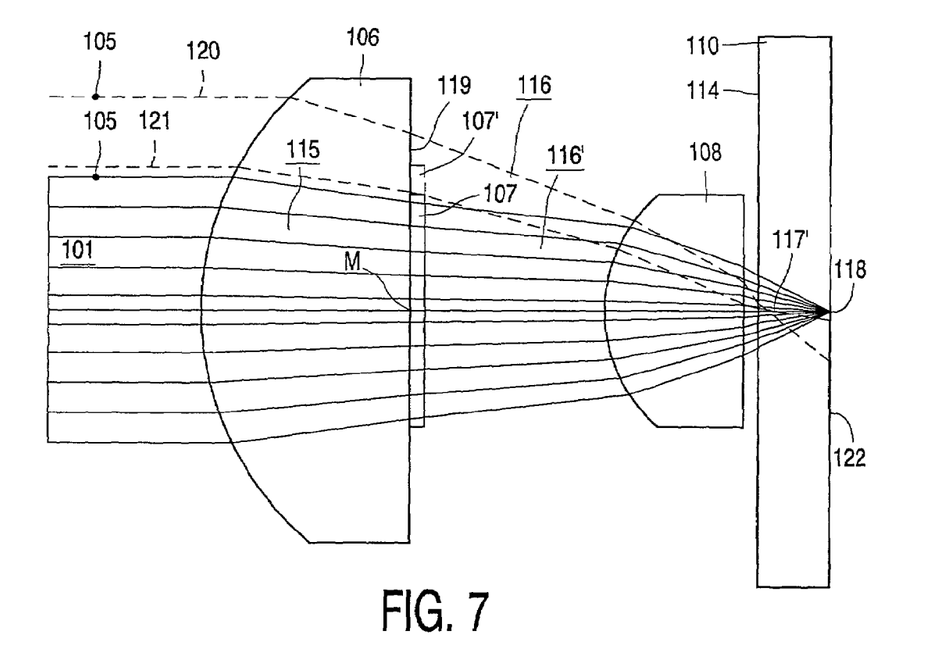
FIG. 7 is a cross-section of a device according to the invention, used for DVD.

FIGS. 6 and 7 show examples of using the invention, in which FIG. 6 shows the use of the invention for DVR and FIG. 7 shows the use of the invention for DVD.

DVR is characterized by reading and writing at a numerical aperture of 0.85 and a wavelength of 400 nm, in which the layer thickness of the transparent layer 11 through which the beam must reach the surface which is written or read is 0.1 mm. Note that only this layer thickness is indicated in FIGS. 6 and 7 and that this layer is of course present on a thicker sub-layer (not shown). In the same situation for DVD, the numerical aperture at a wavelength of 400 nm is 0.60 for reading and 0.65 for writing, and the transparent layer 10 has a layer thickness of 0.6 mm.

In FIG. 6, the reference numeral 104 denotes the direction-polarized laser beam 101 which is incident on the plano-convex lens 106 and diffracted thereby as beam 115. Beam 115 is subsequently incident on the plane exit face of the plano-convex lens 106 and on the diffraction grating 107 in the central part of the radiation beam 101 and the plano-convex lens 106. As described hereinbefore, the diffraction grating 107 results in a zero-order diffraction for the direction of polarization 104, which means that the beam 115 is diffracted by the plane surface of the lens 106 to a beam 116, while the presence of the diffraction grating 107 has no influence. The radiation beam 116 is subsequently focused by the plano-convex lens 108 and the thickness of the transparent layer 109 in a focus 117 at 0.1 mm under the entrance face 114.

In FIG. 7, the same device is shown, in which the radiation beam 101 is polarized, as indicated by direction of polarization 105. The Figure also shows that the radiation beam 101 is diaphragmed by a diaphragm (not shown) to form the radiation beam 115 with such a diameter that, upon incidence on the plane surface of the plano-convex lens 106 and around the center M, the diffraction grating 107 is completely filled up. For the direction of polarization 105, the presence of the diffraction grating 107 has the result that the radiation beam 115 is diffracted in a higher order to form a radiation beam 116'. After passing through the plano-convex lens 108 and the transparent layer 110, the beam 116' is focused in a focus 118 at 0.6 mm under the entrance face 114 of the transparent layer 110.

FIG. 7 also indicates the consequences when the radiation beam 101 with polarization direction 105 is not diaphragmed. Then, a part of the radiation beam 101 will be incident on the plane surface of the plano-convex lens 106 in an annular part 119 where the diffraction grating 107 is not present. This is indicated by way of broken lines 120 and 121. Due to the absence of the diffraction grating 107 in the annular part 119, the part of the radiation beam 101 situated between the broken lines 120 and 121 will subsequently go on in the way radiation beam 116 extends between the plano-convex lens 106 and the plano-convex lens 108 and will subsequently be focused by the plano-convex lens 108 and the transparent layer 110 to a focus 117' which is at about 0.1 mm under the entrance face 114, provided that the distance between the plane surface of the plano-convex lens 108 and the entrance face 114 is the same. At a different distance between the plane surface of the plano-convex lens 108 and the entrance face 114, the distance between the focus and the entrance face 114 will be slightly larger or slightly smaller than 0.1 mm. This difference is not essential for the following aspects. Subsequently, the beam focused at the focus 117 will defocus again and illuminate an annular area 122 on the record carrier 110. As can be seen in FIG. 7, the intensity of the radiation in the area 122 is many times lower than the intensity of the focused radiation beam at the focus 118, and the area 122 does not cover the focus 118. As a result, some information scanned by the radiation beam 116 in FIG. 7 will not have any influence or a negligible influence on the signal in the area 122, which signal is generated by the reflection from the focus 118 of the radiation beams 101, 115, 116'.

If, for whatever necessary reason, the radiation beam 101 cannot or insufficiently be diaphragmed, and the diffraction grating 107 extends up to a larger distance from the center M than that corresponding to a numerical aperture for DVD, the following situation will occur. The part of the radiation beam 101, shown by way of solid lines in FIG. 7, will still give rise to focusing at the focus 118. However, a part of the beam 101, located between the broken lines 120 and 121 and corresponding to a diffraction grating having a diameter shown as 107' around the center M, may lead to an increase of aberrations so that there will also be light around the focus 118 rater than in the focus 118. The large numerical aperture renders the device more sensitive to tolerances of, for example, the tilt angle of the record carrier. The consequences of larger aberrations due to an extension of the diffraction grating 107 to a diffraction grating 107', which may extend throughout the plane surface of the plano-convex lens 106, results in a greater sensitivity of the device to deviations from the nominal values of the record carrier and its movement, but does not lead to the situation where the device is no longer usable. By shaping the plano-convex lens 108 in the correct manner, an increase of these aberrations can be limited or even maintained at zero, namely by ensuring that the plano-convex lens 108 introduces the correct quantity of aberration so as to neutralize the aberration introduced by the diffraction grating 107.

The quality of the embodiments described above can be deduced from the tolerances that can be achieved. At a wavelength of the radiation in the radiation beam of $\lambda=400$ nm, a numerical aperture of 0.6 for DVD and 0.85 for DVR, and a distance of 50 µm between the plane surface of the lens 108 and the entrance face of the transparent layer 110, and of 75 µm between the plane surface of the lens 108 and the entrance face of the transparent layer 109 for DVR, the tolerances are as follows.

For DVR (diameter entrance pupil 2.835 mm):
nominally: 0.3 m$\lambda$ rms, 15 µm; decentering of the lenses: 19.5 m$\lambda$ rms, 0.4°; field: 17.5 m$\lambda$ rms.

For DVD (diameter entrance pupil 1.874 mm):
nominally: 5.4 m$\lambda$ rms, 15 µm; decentering of the lenses: 35.2 m$\lambda$ rms, 0.3°; field: 37.0 m$\lambda$ rms.

After the foregoing, different embodiments and modifications of the devices described, all of which are within the scope of the present invention, will be evident to those skilled in the art. All of these embodiments are considered to embody the present invention as defined in the appendant claims.

The invention claimed is:

1. A device for reading and/or writing a record carrier, the device including a radiation source and means for converging a radiation beam from the radiation source on a written surface and/or a surface to be written of the record carrier, said means including polarization means and a diffraction grating of at least a birefringent material for focusing the radiation beam on one of two possible types of surfaces in dependence upon a direction of polarization of the radiation beam, a first surface of said two possible types of surfaces corresponding to a surface to be read and/or to be written of a first type of record carrier, and a second surface corresponding to a surface to be read and/or to be written of a second type of record carrier, characterized in that the diffraction grating is present in a central area of the radiation beam, and in that the diffraction grating forms substantially a first diffraction beam for a first direction of polarization of the radiation beam and substantially a second, higher-order diffraction beam for a second direction of polarization of the radiation beam, such that the radiation beam contains both the first and second diffraction beams and wherein the diffraction grating is divided into a plurality of zones with the zones becoming more narrow preceding from a center of the diffraction grating towards an edge of the diffraction grating in a direction perpendicular to to optical axis.

2. A device as claimed in claim 1, characterized in that the first diffraction beam is a zero-order diffraction beam.

3. A device as claimed in claim 1, characterized in that the diffraction grating is arranged on a plane surface.

4. A device as claimed in claim 1, characterized in that the converging means comprise at least one lens having a plane surface, and in that the diffraction grating is arranged on the plane surface of the at least one lens.

5. A device as claimed in claim 1, characterized in that the diffraction grating is made of only birefringent material.

6. A device as claimed in claim 5, characterized in that the birefringent material is a liquid crystal material.

7. A device as claimed in claim 6, characterized in that the liquid crystal material is curable by ultraviolet light.

8. A device as claimed in claim 6, characterized in that the polarization means polarize the radiation beam circularly, and in that the liquid crystal material is a cholesteric liquid crystal material.

9. A device as claimed in claim 1, characterized in that the diffraction grating comprises annular zones ($Z_n$, $Z_{n+1}$).

10. A device as claimed in claim 9, characterized in that each zone ($Z_n$, $Z_{n+1}$) comprises a profile having at least two steps.

11. A device as claimed in claim 10, characterized in that each zone ($Z_n$, $Z_{n+1}$) comprises a profile having at least three steps.

12. A device as claimed in claim 9, characterized in that zones ($Z_n$, $Z_{n+1}$) comprise a blazed profile.

13. A device for reading and/or writing a record carrier comprising:
a radiation source emitting a radiation beam;
a convergence mechanism that adjusts the radiation beam to converge on a surface of the record carrier, the convergence mechanism including a polarization mechanism and a diffraction grating of at least a birefringent material for selectively focusing the radiation beam on one of at least two possible types of surfaces in dependence on a direction of polarization of the radiation beam, wherein a first surface of said at least two possible types of surfaces corresponds to a first type of record carrier, and a second surface corresponds to second type of record carrier;

wherein the diffraction grating is present in a central area of the radiation beam and in that the diffraction grating forms substantially a first diffraction beam for a first direction of polarization of the radiation beam and substantially a second, higher-order diffraction beam for a second diffraction beams of the radiation beam and, such that the radiation beam contains both the first and second directions of polarization and wherein the diffraction grating is divided into a plurality of zones with the zones become more narrow preceding from a center of the diffraction grating towards an edge of the diffraction grating in a direction perpendicular to the optical axis.

14. A device as claimed in claim 13, characterized in that the first diffraction beam is a zero-order diffraction beam.

15. A device as claimed in claim 13, characterized in that the diffraction grating is arranged on a plane surface.

16. A device as claimed in claim 13, characterized in that the polarization mechanism polarizes the radiation beam circularly, and in that the liquid crystal material is a cholesteric liquid crystal material.

17. A device as claimed in claim 13, characterized in that the zones of the diffraction grating are annular zones.

18. A device as claimed in claim 17, characterized in that each annular zone has a profile having at least two steps.

19. A device as claimed in claim 17, characterized in that each annular zone comprises a profile having at least three steps.

20. A device as claimed in claim 13, characterized in that zones comprise a blazed profile.

* * * * *